United States Patent [19]

Kaya et al.

[11] Patent Number: 5,210,589
[45] Date of Patent: May 11, 1993

[54] APPARATUS FOR MEASURING OPTICAL-AXIS DEFLECTION ANGLE OF HEADLIGHT

[75] Inventors: Toshiyuki Kaya; Osamu Takao; Nobuo Matsushita, all of Hiroshima, Japan

[73] Assignee: Chuo Electronic Measurement Co., Ltd., Hiroshima, Japan

[21] Appl. No.: 808,351

[22] Filed: Dec. 16, 1991

[51] Int. Cl.[5] .............................................. G01J 1/00
[52] U.S. Cl. .................................................. 356/121
[58] Field of Search ........................... 356/121; 33/288

[56] References Cited

U.S. PATENT DOCUMENTS 3,666,369 5/1972 Carrigan .............................. 356/121

FOREIGN PATENT DOCUMENTS

2201199 7/1973 Fed. Rep. of Germany ...... 356/121

*Primary Examiner*—F. L. Evans
*Attorney, Agent, or Firm*—Jordan and Hamburg

[57] ABSTRACT

In the apparatus for measuring optical-axis deflection angle of a headlight, according to the present invention, the optical-axis detecting means (3) detects the optical axis (1″) of the light projected at the first location ($E_1$) from the headlight (7), and the screen box moving mechanism (2) moves until the position of the optical axis (1″) coincides with the center of the screen (9). Then, the screen box is stopped there. Next, the screen moving mechanism (10) is put into operation to move the screen (9) from the first location ($E_1$) to the second location ($E_2$), the optical-axis detecting means (3) detects the optical axis (1″) from the light projected onto the screen (9), and the controlling means (6) makes a predetermined calculation from the information on the optical-axis position, thereby calculating a deflection angle ($\alpha_1$, $\alpha_2$) of the optical axis.

4 Claims, 6 Drawing Sheets

APPARATUS FOR MEASURING OPTICAL-AXIS DEFLECTION ANGLE OF HEADLIGHT

BACKGROUND OF THE INVENTION

1. Field of the Invention

The present invention relates to an apparatus for measuring the deflection angle of the optical axis of a light beam projected from an automotive headlight.

2. Description of the Prior Art

When a car is driving at night or in a similar condition, its headlights should not dazzle the driver of a car driving in the opposite lane or people walking toward the car but provide sufficient illumination for the driver to have an easy viewing in front of the car. For these purposes, it is legally prescribed that the angles of the optical-axis deflection (deviation) of the light beam projected from the headlight in the horizontal and vertical directions should be within the respective predetermined allowable ranges.

Accordingly, for example, after manufacture and assembling of a car or during inspection after the car has been used for a predetermined period, the optical-axis of the headlight is measured to check whether its angle of deflection is within the predetermined allowable range. For such measurement of the optical-axis deflection angle of the headlight, a variety of measuring apparatuses have been proposed so far.

Figure 1:
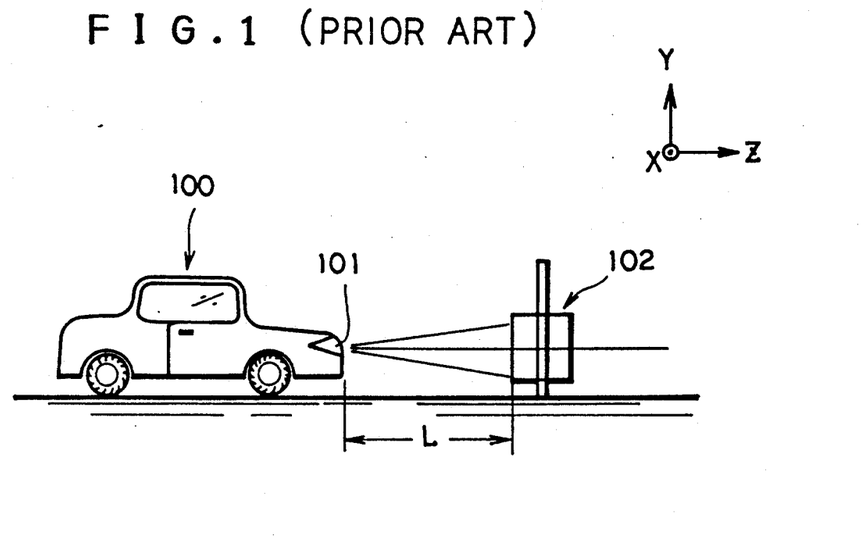
FIG. 1 is a side elevation of a conventional optical-axis deflection angle measuring system.
Figure 2:
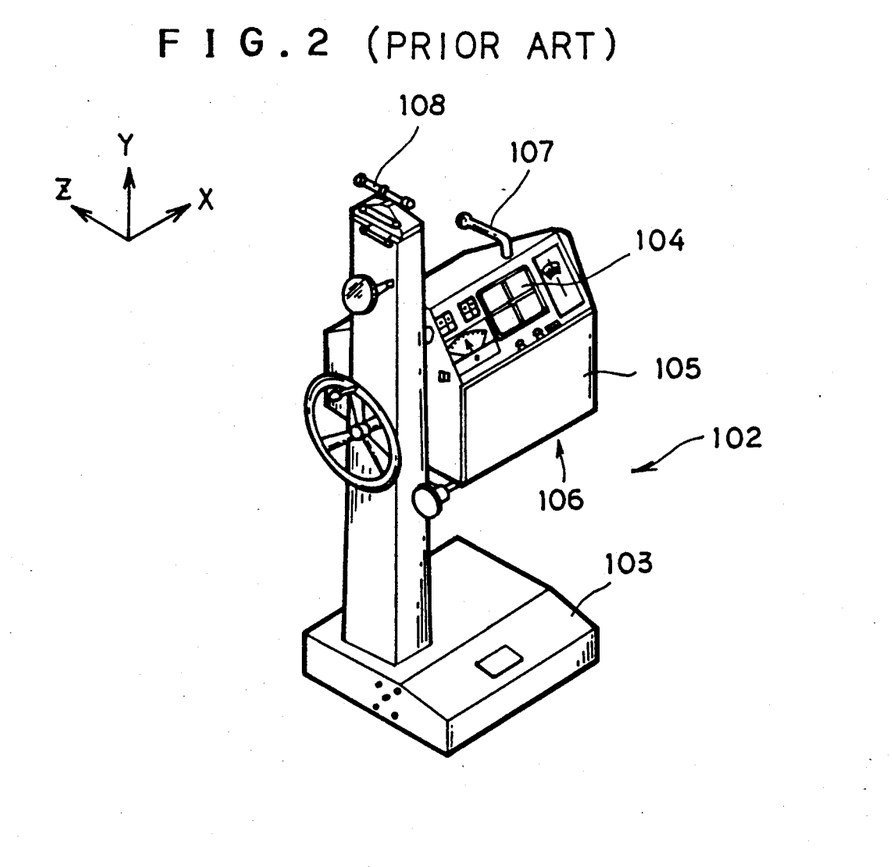
FIG. 2 is a perspective view of a measuring apparatus used in the measuring system shown in FIG. 1.

One of the well-known apparatuses for measuring the optical-axis deflection angle of light beam projected from an automotive headlight will be described by way of example with reference to FIG. 1. FIG. 1 illustrates that a car 100 is stopped at a predetermined position while an optical-axis deflection angle measuring apparatus 102 is spaced at a predetermined distance L from a headlight 101 of the car 100. As will be seen from FIG. 2, the optical-axis deflection angle measuring apparatus (will be referred to as "measuring apparatus" hereinbelow) 102 comprises a base 103 and a screen 104 freely movable vertically (in the Y-direction) and horizontally (in the X-direction). The light projected from the headlight 101 is collected in the main unit 106 through a converging lens 105, and projected onto the screen 104. For measurement of the optical axis of the light with the measuring apparatus 102, the screen 104 is positioned in the vertical and horizontal directions, the position of the optical axis of the light projected on the screen 104 is determined while viewing through the view-finders 107 and 108, and then the deflection angle of the optical axis is calculated from the measured position thereof.

With such measuring apparatus, however, the inspecting worker positions the screen with respect to the headlight in a manual and visual manner using the finders. Thus, much labor and time are needed for attaining a positioning of the screen in a precisely aligned relationship with the headlight, and such positioning is possible inaccurate in some cases.

Also with such measuring apparatus, the inspecting worker visually locates the optical axis from the light projected on the screen for determination of the position of the optical axis. This work requires the worker to have a sharp sense, a high skill and much experience. That is, the work is difficult and thus likely to be erroneous.

SUMMARY OF THE INVENTION

Accordingly, the present invention has an object to overcome the above-mentioned drawbacks of the prior art by providing an apparatus for measuring the optical-axis deflection angle of a headlight automatically, accurately and speedily.

The above object can be attained by providing an apparatus for measuring the optical-axis deflection angle of an automotive headlight comprising, according to the present invention, a mechanism for shifting from one location to another a screen onto which the light beam from a headlight is projected; means for detecting the position of the optical axis of the light beam projected onto said screen at each of said locations; a means for detecting the deviation of optical-axis position caused by the shifting of said screen; and means for calculating the deflection angle of optical axis from the spacing between said locations of said screen and said deviation.

BRIEF DESCRIPTION OF THE DRAWINGS

These and other objects and advantages of the present invention will be better seen from the ensuing description made, by way of example, of the embodiments of the present invention with reference to the drawings, in which.

DETAILED DESCRIPTION OF THE PREFERRED EMBODIMENTS

One preferred embodiment of the measuring apparatus according to the present invention will be described herebelow with reference to the drawings.

Figure 3:
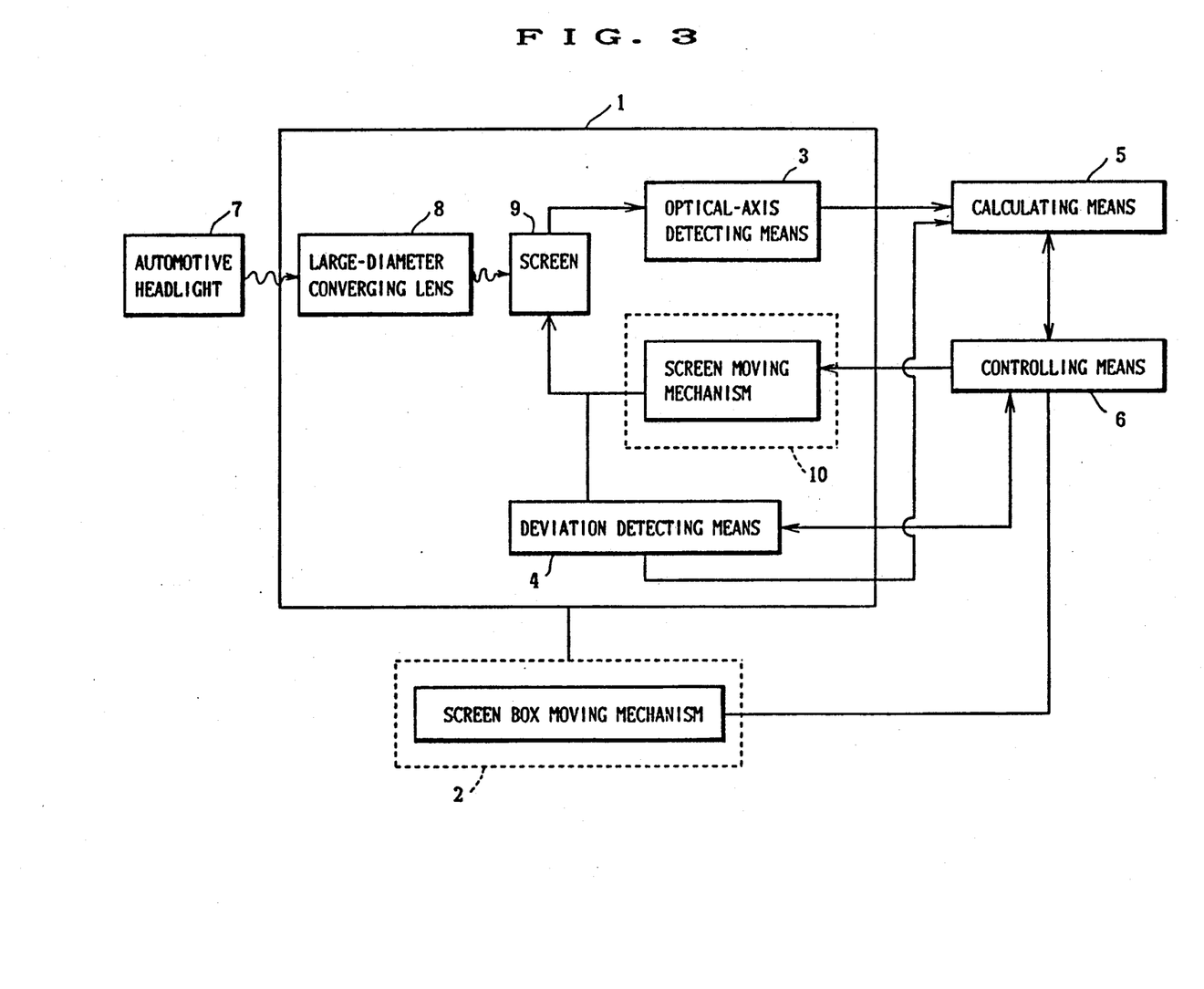
FIG. 3 is a schematic block diagram of an apparatus for measuring the optical-axis deflection angle of a headlight according to a first preferred embodiment of the present invention.

FIG. 3 illustrates a means for measuring the optical-axis deflection angle of a headlight (will be referred to as "measuring apparatus" also herebelow) comprising screen box 1, a screen box moving mechanism 2, optical-axis detecting means 3, a deviation detecting means 4, a calculating means 5 and controlling means 6.

The reference numeral 7 indicates an automotive headlight to be inspected. The car provided with this headlight is precisely stopped at a predetermined positioned beforehand.

Figure 4:
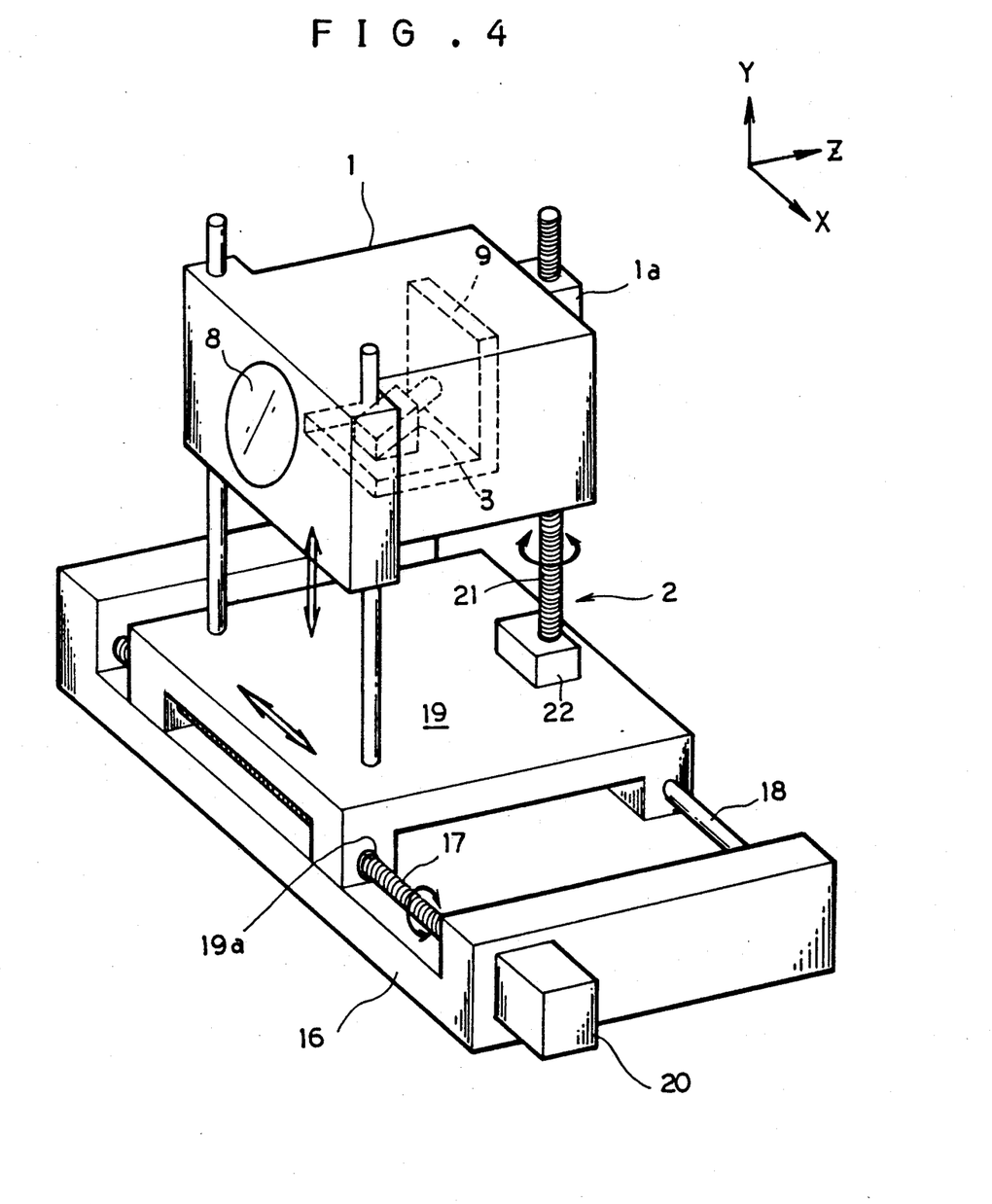
FIG. 4 is a perspective view of the screen box moving mechanism according to the present invention.
Figure 5:
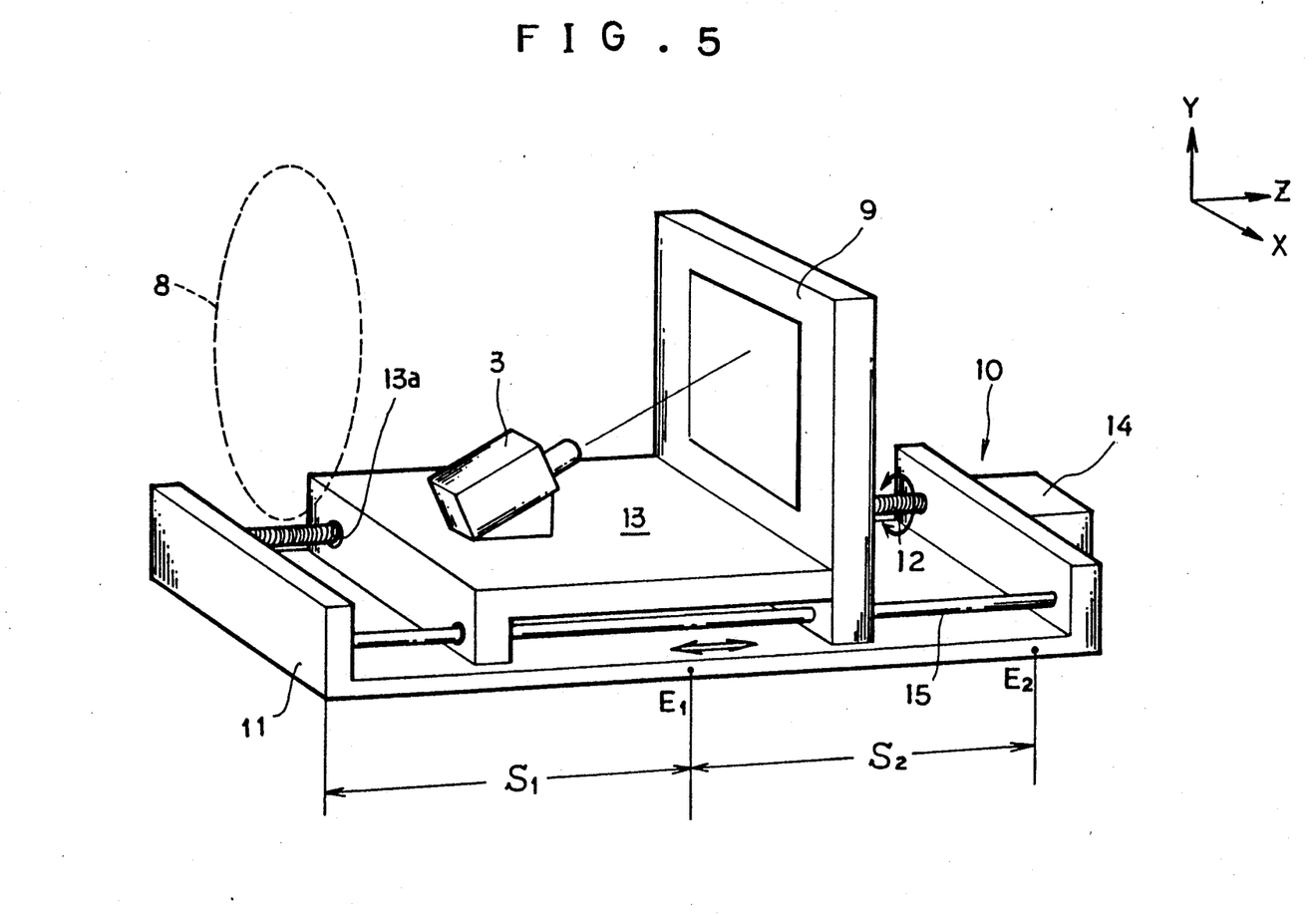
FIG. 5 is also a perspective view of the screen moving mechanism provided inside the screen box, according to the present invention.

The screen box 1 is disposed at a predetermined position in front of the automotive headlight 7 under inspection. As shown in FIG. 4, the screen box 1 has a large-diameter converging lens 8 at the front side thereof facing the headlight 7, and incorporates a screen 9 movable back and forth (in the Z-direction) in relation to the headlight 7. Further, the screen box 1 comprises a screen moving mechanism 10 which moves the screen 9 in the Z-direction from a first location ($E_1$) to a second location ($E_2$) as will be seen in FIG. 5. The converging lens 8 used has the same curvature on both sides thereof, namely, it is a biconvex lens having the same focal distance f on both sides thereof. As shown in FIG. 5, the screen moving mechanism 10 comprises a base 11, a screw shaft 12 disposed rotatably in the Z-direction relative to the base 11, a slider 13 having formed therein a threaded hole 13a through which the screw shaft 12 is screwed and on which the screen is fixed, a screen moving drive motor 14 to rotationally drive the screw shaft 12, and a guide shaft 15 provided as passed through the slider 13 and supported in the base 11 parallelly with the screw shaft 12.

The screen box moving mechanism 2 is provided to move the screen box 1 independently in two different directions, namely, in the Z- and Y-directions which is parallel to the surface of the screen 9. The screen box moving mechanism 2 in this first embodiment of the present invention consists, as shown in FIG. 4, of an X-directional moving mechanism comprising a screw shaft 17 and guide shaft 18 disposed in the X-direction as supported in a base 16, a slider 19 having formed therein a threaded hole 19a through which the screw shaft 17 is screwed and a first screen-box moving drive motor 20 which rotationally drives the screw shaft 17; and a Y-directional moving mechanism comprising a feeding block 1a provided on the screen box 1 and having a threaded hole through which a screw shaft 21 provided as standing upright in the Y-direction (vertically) on the top of the slider 19 is screwed, and a second screen-box moving drive motor 22 which rotationally drives the screw shaft 21. The first and second screen-box moving drive motors 20 and 22 are feedback-controlled by the controlling means 6 so that the optical-axis position of the headlight, varying from one car to another under inspection, coincides with the center of the screen 9 set at the first location ($E_1$).

The optical-axis detecting means 3 is provided to pick up the light emitted from the headlight 7 and incident upon the screen 9 through the lens 8 and optically detect from the picked-up light a hot point (point of a maximum illuminance) corresponding to the optical axis. This detecting means 3 used in this embodiment is a VTR camera using pickup elements such as CCD (charge coupled device) or the like. The hot point is detected through a predetermined image processing. The that the optical-axis detecting means 3 is not limited to the device in this embodiment but the hot point may be detected by a photo-current ratio or the similar signal outputted from, for example, photo-sensors or the like disposed symmetrically to each other with respect to the center of the screen 9.

The deviation detecting means 4 is provided to accurately detect a positional deviation of the optical axis in each of the X- and Y-directions between a position ($X_2$, $Y_2$) attained by activating the screen box moving mechanism 2 with the screen 9 kept set at the second position ($E_2$) to move the screen box 1 in each of the X- and Y-directions until the hot point coincides with the screen center, and a similar position ($X_1$, $Y_2$) at the first position ($E_1$). Namely, the deviation detecting means 4 detects $\Delta x$ ($=X_1-X_2$) and $\Delta y$ ($=Y_1-Y_2$) precisely. The deviation detecting means 4 in this embodiment is arranged to optically detect a positional deviation of the optical axis from each rotated amount of the screw shafts 17 and 21. This means 4 consists of a rotary body (not shown) provided on the outer circumference thereof a scale with regularly spaced divisions, and a photo-sensor (not shown) which supplies to the controlling means 6 pulse signals corresponding in number to the count of the scale divisions provided on the rotary body.

Figure 6:
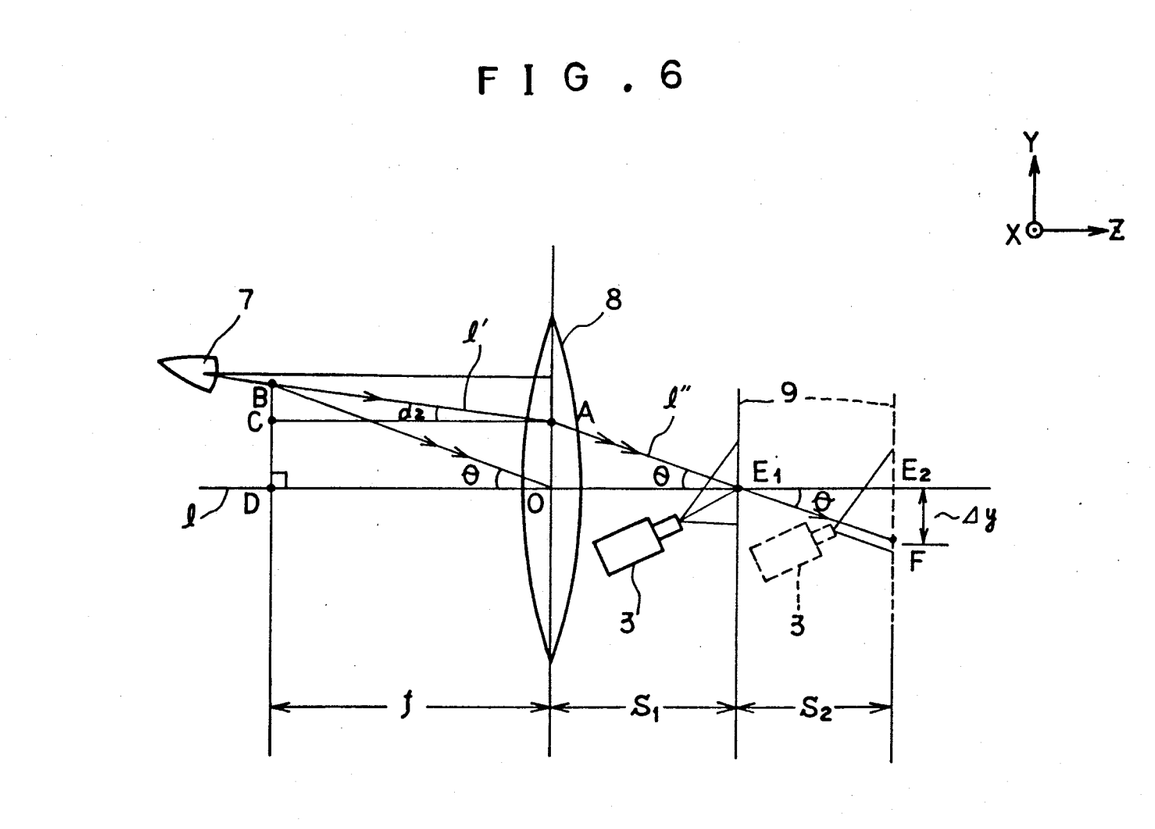
FIG. 6 is an explanatory illustration of the determination of the optical-axis deflection angle when the light projected from a headlight travels, according to the present invention.

Counting the pulse signals supplied from the above-mentioned deviation detecting means 4, the calculating means 5 calculates deviations $\Delta x$ and $\Delta y$ of the optical-axis position in the X- and Y-directions, and it also calculates each of the optical-axis deflection angles $\alpha_1$ and $\alpha_2$ from the data on the deviations $\Delta x$ and $\Delta y$ using the following equations. For example, the optical-axis deflection angle $\alpha_2$ in the Y-direction can be calculated by the following equation (a) in the optical geometry shown in FIG. 6:

$$\alpha_2 = \tan^{-1}[(f-S_1)\cdot\Delta y / f\cdot S_2] \tag{a}$$

where
   f: Focal distance of converging lens 8
   $S_1$: Distance between conveging lens 8 and first location ($E_1$)
   $S_2$: Distance between first location ($E_1$) and second location ($E_2$)

The equation (a) for the optical-axis deflection angle $\alpha_2$ will now be derived referring to FIG. 6.

First, assume that the focal point on the optical axis of the converging lens 8 in the physical space (lefthand space of the lens) is D. Also assume that the intersection of the optical axis l' of the light projected from the headlight 7 with a line normal to the optical axis on the focal point D is B. The angle $\theta$ formed between a line OB connecting the point B and the center 0 of the lens 8 and the optical axis l of the lens 8 is equal to the angle $\theta$ formed between the optical path (optical axis l″) along which the precedent light (optical axis l') travels after refracted by the lens 8 and the optical axis l of the lens 8. This is because when the light source (the point B is assumed to be light source) lies in the focal position, each light emitted from the light source and traveling after passing by the center of the convex lens becomes parallel to the traveling direction of the light passing by the center of the convex lens. Also, the point $E_1$ where the light (optical axis l') through the point B intersects the optical axis l of the lens 8 after passing through and refracted by the lens 8 is set at the first location ($E_1$) of the screen 9, and a position on the optical axis l and apart a distance $S_2$ from the first location ($E_1$) is set at the second location ($E_2$).

Under these conditions, elementary mathematics can be used derive the following equation (a) for $\triangle ABC$:

$$\alpha_2 = \tan^{-1}[BC/f] \tag{b}$$

Also, the following equation can be obtained for $\triangle OBD$:

$$BD = f\tan\theta = BC + CD$$

therefore, $$BC = f\tan\theta - CD \tag{C}$$

The following equation can be obtained for $\triangle FE_1E_2$:

$$f\tan\theta = \Delta y / S_2 \tag{d}$$

Also, the following equation can be obtained for $\Delta OAE_1$:

$$OA (= CD) = S_1 \tan \theta \quad \text{(e)}$$

Hence, by inserting the equations (c), (d) and (e) into the equation (b), the equation (a) can be easily obtained.

The derivation of $\alpha_2$ has been described in the foregoing, but the elementary mathematics can be similarly used to obtain an equation for derivation of $\alpha_1$.

The controlling means 6 is intended to provide a feedback control by activating the screen box moving mechanism 2 when deviation exists between the optical-axis position on the screen 9 and the center of the screen 9 and making the optical-axis position coincide with the center of the screen 9, and also to control the operation of the screen moving mechanism 10 for moving the screen 9 from the first to the second location. In this embodiment, a microcomputer is used as this controlling means. The controlling means 6 in this embodiment is connected to the first and second screen-box moving drive motors 20 and 22, and also to the calculating means 5.

It should be noted that in the measuring apparatus according to the present invention, a foldable first screen and a second screen may be fixed at the first and second locations, respectively, inside the screen box in lieu of the screen and the mechanism which moves the screen.

Figure 7:
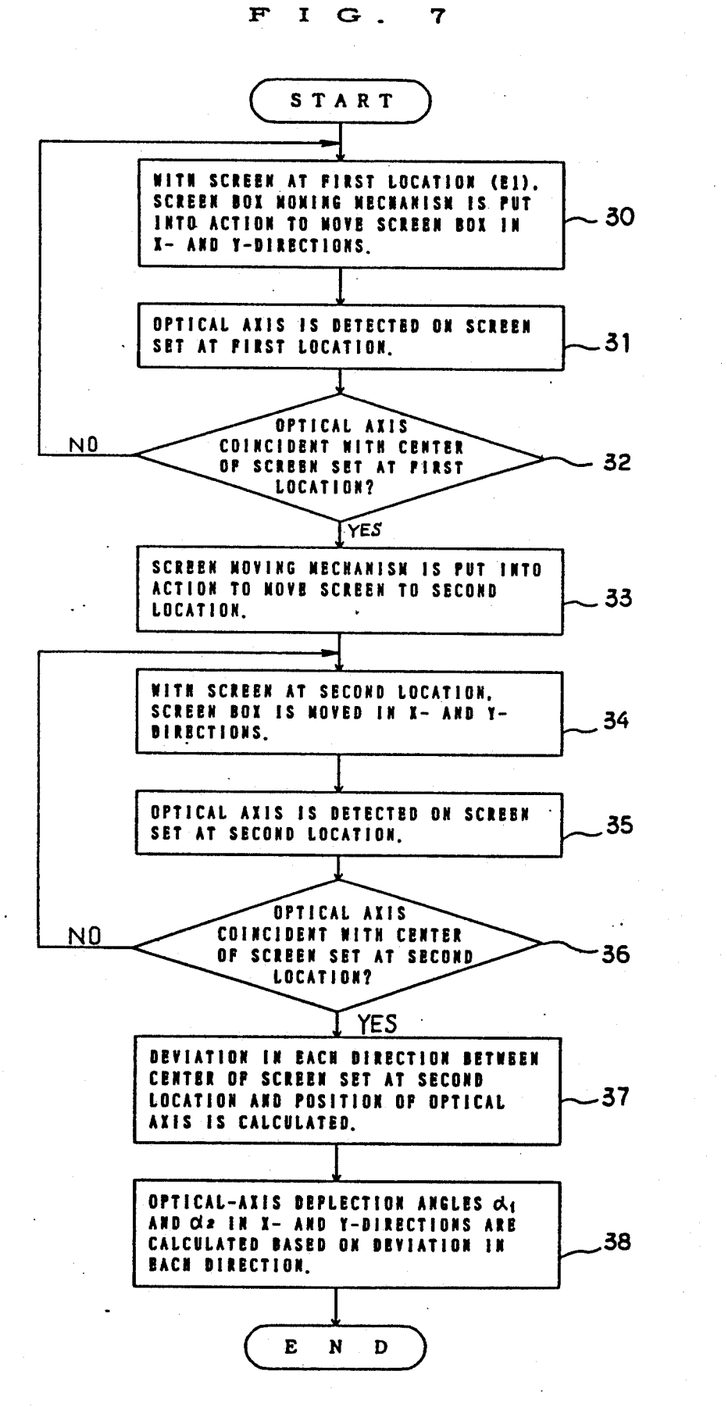
FIG. 7 is a flow chart showing the process of determining the optical-axis deflection angle using the apparatus for measuring the optical-axis deflection angle of a headlight according to the present invention.

Next, the measurement of the optical-axis deflection angle using the measuring apparatus according to the embodiment in consideration will be discussed referring to FIG. 7.

I. First, the screen box moving mechanism 2 is put into operation with the screen 9 kept set at the first location ($E_1$), namely, with the screen moving mechanism 10 not in operation. That is, the screen box 1 is appropriately moved in the X- and Y-directions while controlling the first and second screen-box moving drive motors 20 and 22 by means of the controlling means 6 (at first step 30).

II. Then, the image projected on the screen 9 through the converging lens 8 at this time is picked up by a VTR camera in the optical-axis detecting means 3 to detect the optical axis, namely, the hot point, on the screen 9 through a predetermined image processing (at second step 31).

III. The controlling means 6 judges whether or not the hot point this detected lies in the center of the screen 9. If the optical axis is not coincident with the screen center, similar operations are repeated again from the first step (3) (at third step 32).

IV. If it is judged at the third step 32 that the hot point coincides with the screen center, the first and second screen-box moving drive motors 20 and 22 are stopped from operating and the screen moving mechanism 10 is put into action. When the screen 9 has been thus moved to the second location ($E_2$), the screen moving mechanism 10 is stopped (at fourth step 33).

V. Then, the first and second screen-box moving drive motors 20 and 22 are put into operation with the screen 9 at the second location ($E_2$) to move the screen box 1 in the X- and Y-directions (at fifth step 34).

VI. The hot point is detected as in the second step 31 (at sixth step 35).

VII. It is judged as at the third step 32 whether or not the hot point lies in the center of the screen 9. If the hot point is not coincident with the screen center, the operation returns to the fifth step 34 and similar operations are repeated (at seventh step 36).

VIII. Further, it is judged at the seventh step 36 that the hot point coincides with the screen center, the first and second screen-box moving drive motors 20 and 22 are stopped and the deviation detecting means 4 accurately detects a deviation ($\Delta x$, $\Delta y$) in each direction between the hot-point position with the screen at the first location ($E_1$) and the hot-point position where the hot point is thus coincident with the screen center (at eighth step 37).

IX. Thus, the calculating means 5 automatically derives the optical-axis deflection angles $\alpha_1$ and $\alpha_2$ in the X- and Y-directions based on the deviation ($\Delta x$, $\Delta y$) detected at the eighth step 37 by using the predetermined equation (a) (at ninth step 38).

As described in the foregoing, the calculating means in the measuring apparatus according to the present invention makes a predetermined calculation, based on a deviation between the position of the optical axis where the latter is made to coincide with the center of the screen set at the first location and the position of the optical axis projected on the screen set at the second location, to automatically detect the deflection angle of the optical axis accurately and speedily, whereby the automotive headlight can be inspected extremely accurately, speedily and thus efficiently without much labor at the car inspection shop. Thus, the inspection of the headlight can be automated.

What is claimed is:

1. An apparatus for measuring the deflection angle of the optical axis of a light beam projected from the headlight of a car under inspection, comprising:
    a screen positioned to face said headlight, so that the beam from said headlight is projected on said screen;
    means for detecting the position of the optical axis of the light beam projected onto said screen;
    a mechanism for shifting the screen from one location to another along with said means of detecting the position of the optical axis, as one united body;
    means for detecting a deviation of optical-axis position caused by shifting of said screen by said shifting mechanism; and
    means for calculating the deflection angle of optical axis from the spacing between said locations of said screen and said deviation.

2. An apparatus for measuring the deflection angle of the optical axis as set forth in claim 1, wherein said deviation detecting means comprises means for detecting the deviation of the optical axis from the screen center caused when the screen disposed with the optical axis coinciding with the center thereof is shifted to said other location.

3. An apparatus for measuring the deflection angle of optical axis of a light beam projected from the headlight of a car under inspection, comprising:
    a screen positioned to receive light projected from said headlight;
    a lens mounted to condense the light beam from said headlight and means for shifting said screen from one location to another, said lens being positioned in the path of light from said headlight to said screen;
    means for optically detecting the position of optical axis of the light beam projected onto said screen;
    means for detecting the deviation of optical-axis position caused by the shifting of said screen;

means for controlling the screen shifting to eliminate the deviation between said optical axis and screen center;

means for determining whether or not the optical axis coincides with the center of said screen; and means for calculating the deflection angle of optical axis from the spacing between said locations of said screen and said deviation.

4. An apparatus for measuring the deflection of optical axis as set forth in claim 3, wherein said deviation detecting means comprises means for detecting the deviation of the optical axis from the screen center caused when the screen disposed with the optical axis coinciding with the center thereof is shifted to said other location.

* * * * *